(12) United States Patent
Jordan et al.

(10) Patent No.: US 11,512,778 B2
(45) Date of Patent: Nov. 29, 2022

(54) PRESSURE-ACTIVATABLE ROTARY SEAL AND ROTARY SEAL ASSEMBLY

(71) Applicant: Trelleborg Sealing Solutions Germany GmbH, Stuttgart (DE)

(72) Inventors: Holger Jordan, Neuhausen a.d.F. (DE); Mandy Wilke, Böblingen (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 927 days.

(21) Appl. No.: 16/195,793

(22) Filed: Nov. 19, 2018

(65) Prior Publication Data

US 2019/0093771 A1 Mar. 28, 2019

Related U.S. Application Data

(63) Continuation of application No. PCT/EP2017/062175, filed on May 19, 2017.

(30) Foreign Application Priority Data

May 20, 2016 (DE) .................... 10 2016 208 697.9

(51) Int. Cl.
*F16J 15/3276* (2016.01)
*F16J 15/16* (2006.01)
(Continued)

(52) U.S. Cl.
CPC ......... *F16J 15/3276* (2013.01); *F16J 15/002* (2013.01); *F16J 15/164* (2013.01);
(Continued)

(58) Field of Classification Search
CPC ...... F16J 15/3276; F16J 15/002; F16J 15/164; F16J 15/3216; F16J 15/3228; F16J 15/3232
See application file for complete search history.

(56) References Cited

U.S. PATENT DOCUMENTS 1,936,804 A * 11/1933 Stein .................. F16C 33/74
277/556
2,596,174 A * 5/1952 Reich .................. F16J 15/3208
277/556
(Continued)

FOREIGN PATENT DOCUMENTS

CN 1928397 A 3/2007
CN 101418860 A 4/2009
(Continued)

*Primary Examiner* — Christine M Mills
*Assistant Examiner* — L. Susmitha Koneru
(74) *Attorney, Agent, or Firm* — Hackler Daghighian Martino & Novak

(57) ABSTRACT

A rotary seal seals a high-pressure region from a low-pressure region and has an assembly sleeve made of a rubber elastic material and at least one pressure-activatable rotary seal element with a seal edge. When a specified differential pressure value is exceeded, the seal edge of the rotary seal element rests sealingly against the seal surface of a machine part, thereby directly displacing a support element elastically supported on the rubber elastic assembly sleeve. When the specified differential pressure value is undershot, the support element is moved rearwards axially in the direction of the high-pressure region such that the seal edge of the rotary seal element is moved backwards into the seal edge rest position in which the rotary seal element lies against the seal surface without contact surface pressure or substantially without contact surface pressure or is arranged at a distance from the seal surface.

21 Claims, 5 Drawing Sheets

(51) Int. Cl.
*F16J 15/3216* (2016.01)
*F16J 15/3228* (2016.01)
*F16J 15/3232* (2016.01)
*F16J 15/00* (2006.01)

(52) U.S. Cl.
CPC ....... *F16J 15/3216* (2013.01); *F16J 15/3228* (2013.01); *F16J 15/3232* (2013.01)

(56) References Cited

U.S. PATENT DOCUMENTS

| | | | | |
|---|---|---|---|---|
| 5,147,494 | A * | 9/1992 | Torii | B60C 23/00363 156/417 |
| 5,183,271 | A * | 2/1993 | Wada | F16J 15/3244 277/575 |
| 5,595,697 | A * | 1/1997 | Wada | F16J 15/3244 277/575 |
| 6,886,834 | B2 * | 5/2005 | Osako | F16J 15/3284 277/558 |
| 7,625,127 | B2 * | 12/2009 | Foti | F16C 19/184 384/477 |
| 7,997,316 | B2 * | 8/2011 | Walter | F16C 41/005 152/417 |
| 9,074,688 | B2 | 7/2015 | Fujii et al. | |
| 2003/0173746 | A1 * | 9/2003 | Ramsay | F16J 15/3268 277/549 |
| 2004/0130101 | A1 * | 7/2004 | Osako | F16J 15/3232 277/549 |
| 2009/0224489 | A1 * | 9/2009 | Lin | F16J 15/3228 277/615 |
| 2014/0027984 | A1 | 1/2014 | Saucerman | |
| 2014/0062031 | A1 * | 3/2014 | Honzek | F16J 15/3228 277/551 |
| 2015/0290986 | A1 * | 10/2015 | Tsiberidis | F16J 15/002 152/417 |
| 2016/0265665 | A1 * | 9/2016 | Desjardins | F16J 15/3252 |
| 2017/0082145 | A1 * | 3/2017 | Harada | F16J 15/3268 |
| 2017/0172018 | A1 * | 6/2017 | Dilmaghanian | F16J 15/3212 |

FOREIGN PATENT DOCUMENTS

| | | | | |
|---|---|---|---|---|
| CN | 102066818 A | | 5/2011 | |
| CN | 103109117 A | | 5/2013 | |
| DE | 10 2014 218106 A1 | | 3/2016 | |
| DE | 102014218106 A1 | | 3/2016 | |
| EP | 1418369 A2 | * | 5/2004 | ............ F16J 15/164 |
| EP | 1 900 982 A1 | | 3/2008 | |
| EP | 2 459 906 A1 | | 6/2012 | |
| EP | 2 259 134 A2 | | 12/2012 | |
| EP | 2 529 134 A2 | | 12/2012 | |
| EP | 2529134 B1 | * | 12/2015 | ............ F16J 15/002 |
| WO | WO-0242666 A1 | * | 5/2002 | ............ F16J 15/324 |
| WO | 2010 139655 A1 | | 12/2010 | |
| WO | WO-2011092111 A2 | * | 8/2011 | ............ F16J 15/002 |

* cited by examiner

PRESSURE-ACTIVATABLE ROTARY SEAL AND ROTARY SEAL ASSEMBLY

CROSS-REFERENCE TO RELATED APPLICATIONS

This continuation application claims priority to PCT/EP2017/062175 filed on May 19, 2017 which has published as WO 2017/198854 A1 and also the German application number 10 2016 208 697.9 filed on May 20, 2016, the entire contents of which are fully incorporated herein with these references.

DESCRIPTION

Field of the Invention

The invention relates to a rotary seal assembly having a pressure-activatable rotary seal and to a rotary seal of this kind. Rotary seal assemblies having at least one rotating or oscillating machine part generally comprise what are known as rotary seals in order to keep lubricating liquids in the system and to prevent the ingress of dirt and water. In addition, the rotary seals make it possible to seal a high-pressure region, which can be pressurized by a fluid, from a low-pressure region and can be used, for example, as rotary unions. By means of rotary unions of this kind, a pressurized fluid can be transferred between a fixed machine part and rotatably mounted machine part.

Background of the Invention

From a functional perspective, the rotary seals used in practice can be divided into permanent sealing systems and "pressure-activatable" systems. In the case of permanently sealing rotary seals, as are disclosed in U.S. Pat. No. 5,174,839 B for example, the sealing edge of the used rotary seal elements permanently rests against the associated sealing surface of one of the two machine parts of the rotary seal assembly at a contact surface pressure necessary to reliably seal the high-pressure region. The rotary seals are therefore subjected to increased mechanical and thermal wear. This is problematic in particular in critical applications and when the rotary seals are required to have long service lives. In practice, pressure-activated rotary seals have therefore become established in which the sealing edge of the rotary seal element is only made to rest against the associated sealing surface of one of the two machine parts when required. This is generally done by pressurizing the high-pressure region intended to be sealed by the rotary seal, i.e. in a manner controlled by a pressure medium. As a result, it is possible for the rotary seal to have significantly longer service lives than comparable permanently sealing systems.

A rotary seal assembly having pressure-activatable rotary seals is known from EP 2 529 134 B1, for example. The known rotary seal assembly is designed as a rotary union. The rotary seal elements each rest directly against a rubber-elastically deformable rest body that is supported on the low-pressure side on a support element. In a non-pressurized state of the high-pressure or rotary union region to be sealed, the sealing edge of the rotary seal element is pushed away from the sealing surface by the rest body and kept in an inactive state by being spaced apart from the sealing surface or resting against the sealing surface at a negligibly small contact surface pressure. For the rotary seal to function reliably, it is essential that the rubber-elastically deformable rest element be contoured highly precisely. This is very demanding from a manufacturing perspective and is therefore very expensive. In addition, when the system is pressurized, frictional contact is established between the rest body and the rotary seal element, potentially reducing the responsiveness of the rotary seal. Furthermore, eccentricity of the machine parts may lead to functional impairments of the rotary seal. If the known rotary seal assembly is arranged in a per se known installation sleeve, made of steel, for the purpose of simplified installation, as is proposed in EP 2 655 941 A1 for example, it is also generally necessary to provide additional seal elements to ensure that the metal installation sleeve is reliably statically sealed from the machine part comprising the seal retaining structure.

The problem addressed by the invention is therefore that of providing a rotary seal assembly having a pressure-activatable rotary seal, and a pressure-activatable rotary seal that have better responsiveness and sealing capacity, even if the machine parts are eccentric, and are simpler to produce and assemble at the same time.

SUMMARY OF THE INVENTION

The problem concerning the rotary seal assembly is solved by a rotary seal assembly having the features indicated in claim 1. The rotary seal according to the invention has the features indicated in claim 20. Advantageous developments of the invention are indicated in the description and in the dependent claims.

The rotary seal assembly according to the invention comprises a first machine part and a second machine part that is (mounted so as to be) rotatable about an axis of rotation relative to the first machine part. One of the two machine parts comprises a seal retaining structure, and the other machine part comprises a sealing surface. A pressure-activatable rotary seal is arranged on the seal retaining structure. The rotary seal makes it possible to seal a high-pressure region H from a low-pressure region N of the rotary seal assembly, and comprises an installation sleeve made of a rubber-elastic material and at least one rotary seal element arranged in or on the installation sleeve. In particular, the rotary seal element may consist of a viscoplastic material, such as polytetrafluoroethylene (PTFE) or a viscoplastic composite material. In particular, the rubber-elastically deformable installation sleeve may consist of rubber or synthetic rubber. It goes without saying that the material of the installation sleeve may be reinforced, in particular fiber-reinforced. The rotary seal element extends away from the installation sleeve towards the sealing surface, for example that of the rotatable machine part.

The rotary seal element may be designed as a radial seal element or as an axial seal element. In the former case, the rotary seal element is annular and extends radially away from the installation sleeve. In the latter case, the rotary seal element extends axially away from the installation sleeve. The rotary seal element comprises, on the free end or free end portion thereof facing away from the installation sleeve, at least one sealing edge.

The rotary seal further comprises a support body which, on the low-pressure-region side, directly or indirectly rests against an elastically deformable support region of the rubber-elastically deformable installation sleeve. On the low-pressure-region side, the rotary seal element is directly supported on the support body such that the sealing edge of the rotary seal element is arranged, in the non-pressure-activated operating state, in an inactive position in which the sealing edge is spaced apart from the sealing surface or rests against the sealing surface without contact surface pressure or substantially without contact surface pressure. In the latter case, the sealing edge of the rotary seal element rests against the sealing surface at such a low contact surface pressure that said sealing edge is not subjected to any significant thermal and mechanical loading. In this case, the contact surface pressure of the sealing edge is preferably less than 10% of the contact surface pressure at which the sealing edge rests against the sealing surface in the pressurized or pressure-activated operating state of the rotary seal element. In the non-pressurized state, the rotary seal element, together with the sealing edge thereof, is therefore directly kept in the inactive position thereof by a support body, in contrast with the known rotary seal assembly mentioned at the outset. It should be noted that the rotary seal element rests directly on the support body.

When a specified differential pressure value $P_{Diff}$ between the high-pressure region H and the low-pressure region N is exceeded, the support body can be moved (along the sealing gap) towards the low-pressure side by the rotary seal element, the support region of the rubber-elastic installation sleeve thereby elastically deforming, such that the sealing edge of the rotary seal is or can be sealingly pressed against the sealing surface. The rotary seal element is thus positioned, by means of the sealing edge thereof, in the specified sealing seat on the sealing surface. In the case of a radially sealing rotary seal element, i.e. a rotary seal element designed as a radial seal element, the support body can therefore be moved towards the low-pressure region in an axial direction relative to the axis of rotation. In the case of an axially sealing rotary seal element, the support body can therefore be moved in a radial direction relative to the axis of rotation. When the high-pressure region is pressurized, the rotary seal element therefore displaces the support body towards the low-pressure region of the rotary seal assembly, in each case in a direction parallel to the sealing surface, such that the sealing edge of the rotary seal element can sealingly rest against the sealing surface. In the pressurized operating state, the sealing edge of the rotary seal element is pressed against the sealing surface at a pressure proportionate to (fluid) pressure $P_H$ prevailing in the high-pressure region H of the rotary seal assembly.

When the specified differential pressure value is fallen below, the support region elastically recovers its shape, the support body thereby moving back towards the high-pressure region. As a result, the sealing edge of the rotary seal moves out of the sealingly resting position thereof against the sealing surface, or wear-inducing contact surface pressure of the sealing edge against the sealing surface is eliminated. The rotary seal is thus spatially decoupled, by the support body, from the rubber-elastically deformable support region, the elastic resilience of which causes the rotary seal to return to the inactive position thereof. As a result, the responsiveness of the rotary seal can be improved even further in comparison with known rotary seal assemblies. Unwanted friction effects between the rotary seal element and the rubber-elastically deformable material of the support region are eliminated. In addition, the support body allows improved lateral guiding of the rotary seal element. Furthermore, the rotary seal element can more effectively compensate for translational relative movements between the two machine parts, in particular for eccentricity of the rotatable machine part in the case of a radially sealing rotary seal. Furthermore, it should also be noted that the installation sleeve, on account of the rubber-elastic material properties thereof, is or can be self-sealingly arranged in the sealing seat thereof on/in the seal retaining structure of the first machine part. Additional seal elements, such as O-rings or the like, are no longer required for the installation sleeve to be statically sealed from the machine part comprising the seal retaining structure. Overall, it is thus possible to produce and assemble the rotary seal assembly in a simple and cost-effective manner.

According to the invention, the support body consists of a viscoplastically deformable material or is designed as a rigid body.

In the former case, the support body can be deformed at least in portions and thereby moved towards the low-pressure region when the rotary seal is pressure-activated. In this case, superposed translational movement of the entire support body is entirely possible. When the support region of the rubber-elastic installation aid elastically recovers its shape as described above, the reverse occurs.

In the latter case, the support body cannot be deformed, or can only be deformed to a negligible degree, by the (compressive) forces arising when the rotary seal assembly is in operation. In particular, the support body may consist of a plastics material, metal or a technical ceramic. If the rotary seal or the rotary seal element thereof is designed to seal axially, the support body designed as a rigid body is preferably multi-part. In this way, the segments, in particular ring halves, of the support body can be translated relative to one another in a radial direction relative to the axis of rotation in order to allow the rotary seal element to be pressure-activated and to be returned to the restored position thereof.

Both the support body and the rotary seal element can be loosely arranged in or on the rubber-elastic installation sleeve. This has certain advantages from a manufacturing perspective and allows simplified installation of the rotary seal or rotary seal assembly. In addition, if the rotary seal element is worn, it is possible to cost-effectively replace only the rotary seal element for a new rotary seal element, as required.

According to the invention, the rubber-elastic installation sleeve may advantageously comprise at least one dynamically sealing seal element or a dynamically sealing lip that is arranged so as to be offset towards the low-pressure region in relation to the rotary seal element. The seal element or sealing lip rests permanently against the sealing surface of the second machine part, i.e. in both the pressurized and non-pressurized operating states of the rotary seal assembly. In particular, the sealing lip may be integrally formed on the installation sleeve, i.e. formed in one piece therewith. The seal element or sealing lip may be an oil seal or a "wiper," for example. In this way, it is possible to better protect the rotary seal assembly from dirt entering the high-pressure region.

According to a preferred development of the invention, the support body has a side flank (shoulder), on the high-pressure-region side, that extends obliquely in relation to the sealing surface, or in relation to the axis of rotation in the case of a rotary seal element designed as a radial seal element, at an acute angle α of α<90°. In this way, a force facing away from the sealing surface of the second machine part can be exerted on the rotary seal element by means of the support body in order to transfer the sealing edge of said rotary seal element into the above-mentioned inactive position, in which the sealing edge is spaced apart from the sealing surface or rests against the sealing surface without contact surface pressure/without significant contact surface pressure.

According to a particularly preferred development of the invention, the support body may fulfill a dual function by projecting beyond the rotary seal element towards the sealing surface in the non-pressurized state of the rotary seal assembly. If one of the two machine parts, in particular the machine part comprising the sealing surface, is eccentric, the support body can function as a stop and thereby protect the rotary seal element from damage, for example. If the rotary seal or the rotary seal element is designed to seal axially, the support body can limit or damp unwanted axial movement of the machine part comprising the sealing surface relative to the machine part comprising seal retaining structure.

According to the invention, the support body may rest against and be supported on the rubber-elastic installation sleeve in a direction orthogonal to the sealing surface, preferably in a manner free of play. In the case of a radially sealing rotary seal, the circumference of the support body therefore rests against and is supported on the installation sleeve. Overall, this makes it possible to damp the above-mentioned eccentricity of both or one of the two machine parts to an effective degree. In addition, in the case of a radially sealing rotary seal, the installation sleeve may be radially supported, in particular on the inside thereof, on the support body and thus be tensioningly retained (clamped) between said support body and the seal retaining structure. In this way, the rotary seal can be rotationally fixed to the machine part comprising the seal retaining structure in a simplified manner.

According to a particularly preferred development of the invention, the support body is designed directly as a bearing part for the machine part comprising the sealing surface. The support body therefore rests against the sealing surface of the machine part in both the pressurized and non-pressurized operating states of the rotary seal assembly. In this way, a floating bearing of the rotatably mounted machine part can be achieved. If the rotary seal element seals radially, i.e. the rotary seal element is designed as a radial seal element, the support body therefore forms, on the inside thereof in the case of an internally sealing rotary seal and on the outside thereof in the case of an externally sealing rotary seal, a plain bearing for the machine part comprising the sealing surface. If the rotary seal is designed to axially seal against the sealing surface, the support body forms an axial bearing for the rotatable machine part. In particular, the support body can rest against the sealing surface of the rotatable machine part in a pretensioned manner on account of the rubber-elastic installation sleeve.

For the purpose of the least possible frictional resistance between the support body and the machine part comprising the sealing surface, the support body or the sealing surface may be provided with a lubricant coating. In addition, on the sealing-surface side, the support body may comprise "tribostructures," which allow dirt that has entered the high-pressure region to be transported (outwards) towards the low-pressure side when the rotary seal assembly is in operation. The tribostructures may, for example, include a groove made in the contact surface of the support body resting against the sealing surface, or at least one structure which is angled in the shape of a V in cross section and of which the legs diverge towards the low-pressure region.

According to the invention, the support body may in principle have a circular, elliptical or polygonal cross-sectional shape. With a view to the least possible material usage, the support body preferably has a cross-sectional shape that widens towards the sealing surface of the second machine part that is intended to be dynamically sealed.

For a reliable sealing seat of the rubber-elastic installation sleeve on the seal retaining structure of the first machine part, the installation sleeve may comprise, on the side thereof facing the seal retaining structure, i.e. on the outer circumferential side (=outside) for example in the case of a radially sealing rotary seal, at least one static sealing lip that sealingly rests against the machine part comprising the seal retaining structure, in particular directly against the seal retaining structure of the first machine part. The sealing lip may advantageously be fluidically connected to the high-pressure region of the rotary seal assembly and be pressure-activatable. In this case, the sealing lip can be pressed against the machine part comprising the seal retaining structure or against the seal retaining structure by means of fluid pressure prevailing in the high-pressure region—at a pressure proportionate thereto. In this way, frictional engagement between the installation sleeve and the machine part comprising the seal retaining structure can be automatically adjusted at the same time. Unwanted corotation of the rotary seal assembly together with the rotatably mounted machine part can thus be prevented. It goes without saying that, in the above-mentioned case, the installation sleeve has to be supported on a support, for example on the support body or of the machine part comprising the seal retaining structure, in a direction orthogonal to the sealing surface.

According to the invention, a gap may be formed between the installation sleeve and the first machine part comprising the seal retaining structure in a direction orthogonal to the sealing surface. According to the invention, the gap may be fluidically connected to the high-pressure region. In the gap, a tensioning element is preferably mounted, which can be axially moved against an external oblique surface of the installation sleeve or of the seal retaining structure by means of fluid pressure prevailing in the high-pressure region in order to frictionally fix the installation sleeve to the first machine part depending on the fluid pressure in the high-pressure region. In particular, the tensioning element may be designed as a tensioning ring, preferably as a tapered ring having a tapered cross-sectional shape. Overall, this makes it possible to even more reliably suppress unwanted corotation of the rotary seal assembly together with the rotatably mounted machine part.

In order for the rubber-elastic installation sleeve to rest and be supported securely, the seal retaining structure preferably comprises a shoulder on the low-pressure-region side.

In particular, the rotary seal element may be retained in a retaining groove in the rubber-elastic installation sleeve. This further simplifies the installation of the rotary seal. The retaining groove is designed as a radial groove in the case of a radially sealing rotary seal or a radially sealing rotary seal element and as an axial groove in the case of an axially sealing rotary seal.

According to the invention, the installation sleeve may comprise an additional rotary seal element that preferably directly rests against and is supported on a second support body, preferably in the axial direction.

According to the invention, the rotary seal assembly may in particular be designed as a rotary union. In this case, according to a first embodiment alternative, the rotary seal assembly may comprise a rotary seal in which the installation sleeve comprises a second rotary seal element that directly rests against and is supported on a second support body. The high-pressure region is formed between the two rotary seals in a direction parallel to the sealing surface and functions as a rotary union region for the fluid. In the case of a radially sealing rotary seal, i.e. rotary seal elements that seal in the radial direction (=radial seal elements), the high-pressure region is therefore formed axially between the two rotary seal elements. Accordingly, in the case of an axially sealing rotary seal, the high-pressure region functioning as the rotary union region is formed radially between the two rotary seal elements. In both cases, the high-pressure region is laterally directly delimited by the rotary seal elements at least in portions. Moreover, the rubber-elastic installation sleeve comprises at least one passage (for example, a through-hole), by means of which a first fluid flow channel arranged in the first machine part is or can be fluidically connected, via the high-pressure or rotary union region, to a second fluid flow channel arranged in the second machine part. In this embodiment, a single installation sleeve is provided for two rotary seal elements and two support bodies.

According to a second embodiment alternative, the rotary seal assembly may comprise two of the above-described rotary seals. In this case, the two rotary seals are arranged so as to be offset from one another in a direction parallel to the sealing surface. If the rotary seal elements are designed as radial seal elements, i.e. in the case of radially sealing rotary seals, the rotary seal elements are therefore arranged successively in an axial direction relative to the axis of rotation. If the rotary seal elements are designed as axial seal elements, the rotary seals are arranged coaxially with the axis of rotation. The two installation sleeves may rest against one another or be mutually spaced. In either case, a passage is formed in one of the two installation sleeves or between the two installation sleeves. By means of said passage, a first fluid flow channel arranged in the first machine part is or can be fluidically connected to a second fluid flow channel arranged in the second machine part. In this embodiment variant too, the high-pressure region of the rotary seal assembly functioning as the rotary union region is arranged between and directly laterally delimited by the two rotary seal elements.

According to the invention, the rotary seal assembly may comprise a plurality of rotary union regions. In this case, each additional rotary union region of the rotary seal assembly is delimited by rotary seal elements of the same rotary seal or a plurality of rotary seals in a manner corresponding to the first rotary union region. In the former case, the rubber-elastic installation sleeve comprises a radial passage, as mentioned above, for each rotary union or high-pressure region H. In the latter case, a plurality of rotary seals are arranged successively or coaxially with the axis of rotation.

According to the invention, the seal retaining structure of one machine part may be designed as a metal sleeve that is retained on the machine part, preferably in a press fit. It goes without saying that the rotary seal may be provided so as to be pre-installed in the metal sleeve in order to easily arrange said metal sleeve in the sealing gap between the two machine parts.

The above-described rotary seal assembly has a wide range of uses and, in particular, can be used in tire pressure control systems, e.g. in motor vehicles or aircraft. In this case, one of the two machine parts may be designed as a drive shaft or as a wheel axle. It goes without saying that in this case the rotary seal assembly may comprise further necessary components, for example one or more valves. Other fields of technical application, e.g. in mechanical or chemical process engineering machines or in household devices, are also conceivable.

In summary, the invention relates to a rotary seal assembly having a rotary seal in order to seal a high-pressure region H from a low-pressure region N of the rotary seal assembly. The rotary seal comprises an installation sleeve made of a rubber-elastic material and at least one pressure-activatable rotary seal element having a sealing edge. When a specified differential pressure value $P_{Diff}$ between the high-pressure region H and the low-pressure region N is exceeded, the sealing edge of the rotary seal element sealingly rests against the sealing surface of a machine part, thereby directly displacing a support body resiliently mounted on the rubber-elastic installation sleeve. When the specified differential pressure value $P_{Diff}$ is fallen below, the support body is axially moved back towards the high-pressure region H such that the sealing edge of the rotary seal element is moved back into the inactive position thereof in which the rotary seal element rests against the sealing surface without contact surface pressure or substantially without contact surface pressure or is spaced apart from the sealing surface. The invention further relates to a rotary seal for a rotary seal assembly of this kind.

BRIEF DESCRIPTION OF THE DRAWINGS

The invention will be described below in more detail on the basis of embodiments reproduced in the drawings. In the drawings, corresponding components are provided with the same reference signs.

In the drawings.

DETAILED DESCRIPTION OF THE PREFERRED EMBODIMENTS

Figure 1:
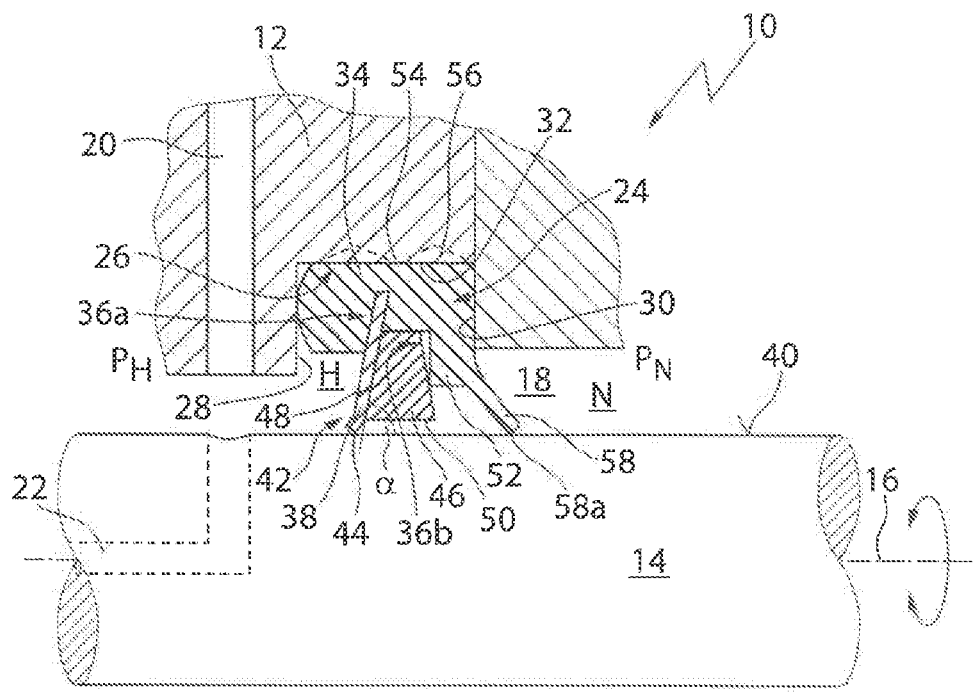
FIG. 1 is a partial sectional view of a rotary seal assembly comprising a machine part that is mounted so as to be rotatable about an axis of rotation, and comprising pressure-activatable rotary seals for radially sealing a high-pressure region functioning as a rotary union region, the rotary seal comprising a rubber-elastic installation sleeve having a rotary seal element that is axially resiliently supported on a support region of the installation sleeve by means of a support body such that the rotary seal element can be pressed against the sealing surface of the rotatably mounted machine part in a pressure-controlled manner, the support region thereby being displaced.

FIG. 1 shows a rotary seal assembly 10 comprising a first machine part 12 and a second machine part 14 that is mounted so as to be rotatable about an axis of rotation 16 relative to the first machine part 12. As shown in FIG. 1, the rotary seal assembly 10 may be designed as a rotary union and, in this case, allows a fluid to be sealingly transferred between the fixed first machine part 12 and the rotatably mounted second machine part 14. A sealing gap 18 is formed between the two machine parts 12, 14. The two machine parts 12, 14 comprise respective fluid flow channels 20, 22 for the fluid, which can be fluidically interconnected by means of a high-pressure region labelled by H. On either side in the axial direction, the high-pressure region H of the sealing gap 18 can be sealed from an axially external low-pressure region N by a rotary seal 24. In this case, the rotary seals seal radially and internally. FIG. 1 is a partial view of just one of the two rotary seals 24. The rotary seals 24 are arranged on respective seal retaining structures 26 of the first machine part 12. In particular, the seal retaining structure 26 may be designed as a retaining groove in the first machine part 12. In this case, the retaining groove comprises two opposing groove flanks 28, 30 that are interconnected by a groove bottom 32. The rotary seal 24 can axially rest against the two groove flanks 28, 30, in particular so as to be pre-tensioned. The groove flank 30 of the seal retaining structure 26 on the low-pressure-region side functions here as a rest shoulder for the rotary seal 24 in order to axially secure said rotary seal in the seal retaining structure 26 when the high-pressure region H is pressurized.

The shown rotary seal 24 comprises an installation sleeve 34 made of a rubber-elastic material. The rubber-elastically deformable installation sleeve 34 comprises a first retaining groove 36a in which a pressure-activatable rotary seal element 38 is retained. The rotary seal element 38 is designed as a radial seal element and extends away from the installation sleeve 34 towards a sealing surface 40 of the rotatable second machine part 14. The rotary seal element 38 comprises a sealing edge 44 on the free end 42 thereof facing away from the installation sleeve 34. The rotary seal element 38 advantageously consists of a viscoplastic material having a preferably low coefficient of friction, such as polytetrafluoroethylene (PTFE) or polyether ether ketone (PEEK) or even a fiber composite material.

The rotary seal 24 comprises an annular support body or support ring 46 against which the rotary seal element 38 rests and is supported in the axial direction in both the non-pressurized and pressurized operating states of the rotary seal 24. The support body 46 may consist of a viscoplastically deformable material or is designed as a rigid body. In the latter case, the support body cannot be radially deformed by means of the operating forces occurring in the high-pressure region H of the rotary seal assembly 10. The support body 46 preferably consists of a plastic material, metal, composite material or technical ceramic.

The support body 46 may extend into a second retaining groove 36b in the rubber-elastic installation sleeve 34. The support body 46 comprises a side flank (shoulder) 48 which faces the high-pressure region H and against which the rotary seal element 38 directly rests in the axial direction. The side flank 48 therefore functions as a rest surface for the rotary seal element 38. The side flank 48 of the support body 46 extends obliquely in relation to the sealing surface 40 or the axis of rotation 16 preferably at an acute angle α of α<90°. The angle α is approximately 80° in the present case.

As shown in FIG. 1, the support body may have a cross-sectional shape that widens radially towards the sealing surface 40. The inside 50 of the annular support body 46 may be fully spaced apart from the sealing surface 40 of the second machine part 14, as shown in FIG. 1. Alternatively, the support body 46 may also directly rest against the sealing surface 40 and form a (plain) bearing for the machine part 14 comprising the sealing surface. In particular in the latter case, it is thereby possible to counteract overloading of the sealing edge 44 of the rotary seal 24 in the case of eccentricity of the rotatably mounted machine part 14.

On the lower-pressure-region side, the support body 46 is axially covered by a rubber-elastically deformable support region 52 of the installation sleeve 34. The support body 46 rests directly against the support region 52 in the axial direction.

In the non-pressurized operating state of the rotary seal, said rotary seal is in the inactive position thereof shown in FIG. 1. In this inactive position, by means of the support body 46, the sealing edge 44 of the rotary seal 24 is held so as to be spaced apart from the sealing surface or held against the sealing surface 40 without contact surface pressure or at a negligibly small contact surface pressure.

Figure 2:
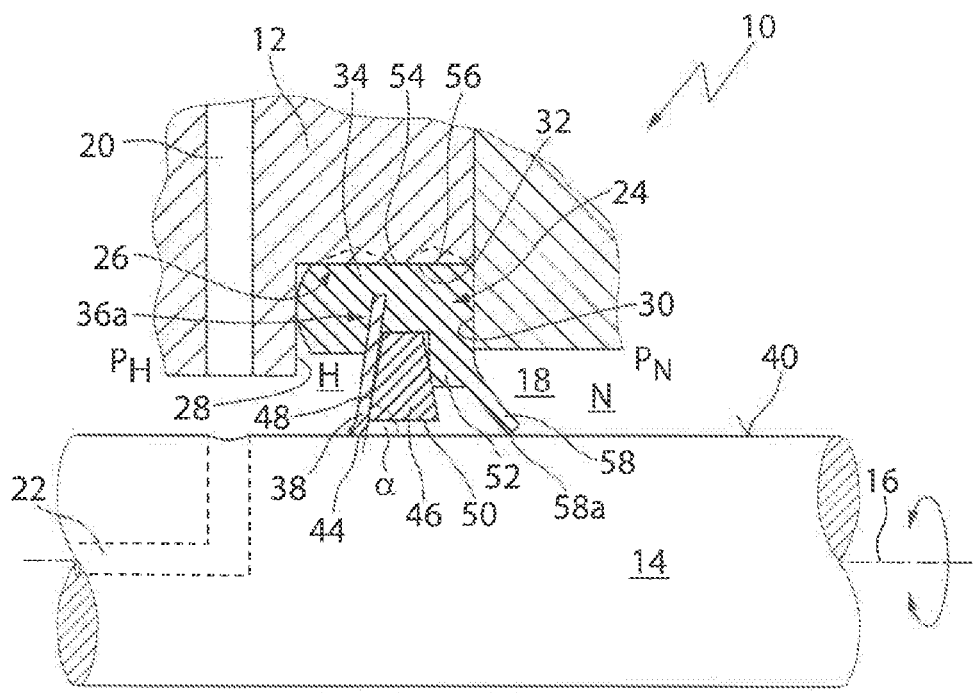
FIG. 2 is a partial sectional view of the rotary seal assembly shown in FIG. 1 showing the rotary seal in a sealing position.

When the pressurized fluid is fed into the high-pressure region H functioning as the rotary union region and a differential pressure value $P_{Diff}$ of pressure $P_H$ prevailing in the high-pressure region H with respect to pressure $P_N$ prevailing in the low-pressure region N is exceeded, the rotary seal element 38 is axially pressed against the support body 46 at a proportionate pressure such that said support body is pushed axially outwards towards the low-pressure side N, the support region 52 of the rubber-elastic installation sleeve 34 thereby deforming, until the sealing edge 44 of the rotary seal element 38 sealingly rests against the sealing surface 40 of the second machine part 14 in a radial direction. Provided the support body consists of a viscoplastic material, the displacement movement thereof can be brought about at least in part by the support body 46 (elastically) deforming in portions towards the low-pressure region N. This causes the high-pressure region H to be fluid-tightly sealed, as shown in FIG. 2. In the pressurized operating state of the rotary seal 24, the sealing edge 44 therefore sealingly rests against the associated sealing surface 40 of the second machine part 14 in the specified sealing seat.

When the specified differential pressure value $P_{Diff}$ is fallen below, the support body 46 is moved axially back into the inactive position thereof shown in FIG. 1, on account of the elastic resilience of the support region 52 of the rubber-elastic installation sleeve 34. As a result, the pressure of the sealing edge 44 of the rotary seal element 38 against the sealing surface 40 is relieved, or in other words said rotary seal element is pushed away from the sealing surface 40 again such that said sealing edge rests against the sealing surface again without contact surface pressure or without wear-inducing contact surface pressure or is radially spaced apart from the sealing surface 40 of the second machine part 14 (FIG. 1).

In the non-pressurized operating state of the rotary seal 24, the support body 46 may project beyond the rotary seal element 38 radially towards the sealing surface 40 of the second machine part 14. In this way, the support body 46 can support the rotary seal element 38 over a particularly large area. Even in high-pressure applications, this makes it possible to prevent the rotary seal element 38 from being axially extruded between the sealing surface 40 and the support body 46. Furthermore, in the case of eccentricity of one of the two machine parts 12, 14, the support body 46 can thus function as a stop element, thereby making it possible to prevent unwanted rubbing of the rotary seal element 38 against the sealing surface 40 of the second machine part 14 in the non-pressurized operating state. In the pressurized operating state of the rotary seal 24, excessive (local) loading of the sealing edge 44 of the rotary seal element 38 can also be reliably counteracted. To this end, the annular support body 46 preferably rests against and is supported on the rubber-elastic installation sleeve 34 in the radial direction, preferably in a manner free of play. This allows radial movement of the support body 46 to be reliably damped. The support body 46 may also rest, on the inside 50 thereof, against the sealing surface 40 and thus form a (plain) bearing for the rotatable machine part 14.

The outside 54 of the rubber-elastic installation sleeve 34 frictionally rests against the seal retaining structure 26, or the groove bottom 32 in this case, of the first machine part 12 to prevent unwanted corotation of the installation sleeve 34 together with the rotatably mounted second machine part 14. To this end, the installation sleeve 34 is preferably radially oversize in relation to the internal diameter of the seal retaining structure of the first machine part 12. In this way, a radial sealing seat of the installation sleeve 34 on the first machine part 12 can be achieved. For a particularly high (static) sealing capacity, the installation sleeve 34 may be provided, on the outside thereof, with one or more static sealing lips 56, which are indicated here in the non-loaded state as dashed lines. It goes without saying that the sealing lip(s) 56 extend(s) over the entire circumference of the installation sleeve 34. Furthermore, the installation sleeve 34 may be radially tensioned against the seal retaining structure 26 of the first machine part 12 by means of appropriate dimensioning of the support body 46.

In addition to the rotary seal element 38, the rotary seal 24 may comprise at least one dynamically sealing lip 58, which is arranged so as to be axially offset towards the low-pressure region N in relation to the particular rotary seal element 38 of the installation sleeve 34. The sealing lip 58 is preferably integrally formed on the rubber-elastic installation sleeve 34. In both the pressurized and non-pressurized states of the rotary seal assembly 10, the sealing edge 58a of the sealing lip 58 sealingly rests against the sealing surface 40 of the second machine part 14. In particular, the sealing lip 58 may function or be designed as an oil seal. In one embodiment of the rotary seal assembly 10 not shown in greater detail in the drawings, the sealing lip 58 may be designed separately from the installation sleeve 34.

Figure 3:
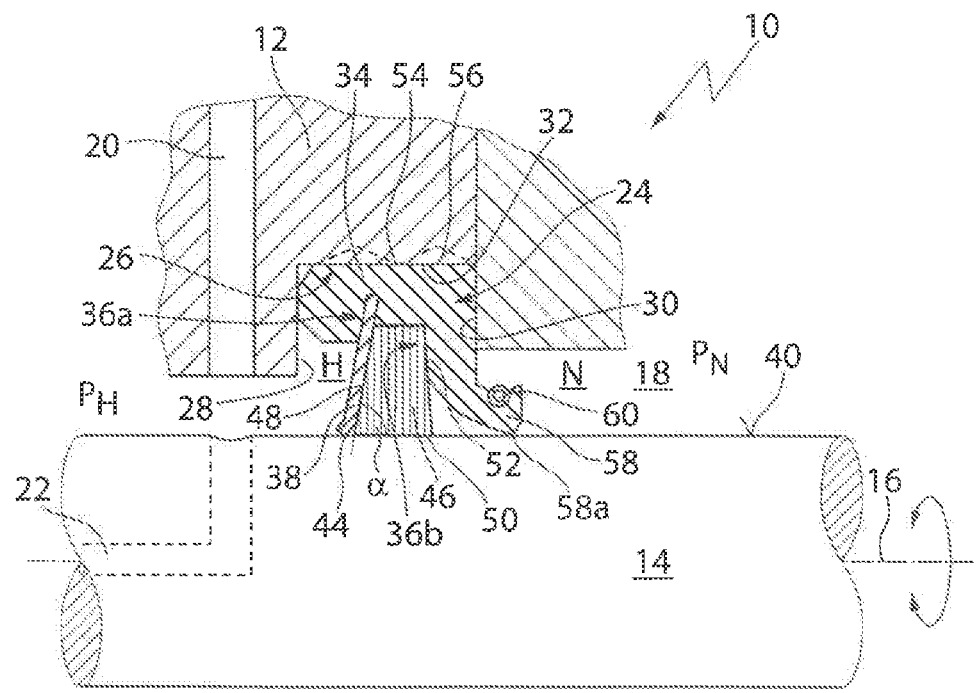
FIG. 3 is a partial sectional view of a rotary seal assembly similar to the rotary seal assembly shown in FIG. 1, comprising an additional oil seal that is integrally formed on the installation sleeve and is tensioned against the sealing surface of the rotatable machine part by means of a spring element.

FIG. 3 is a partial view of a further rotary seal assembly 10, which differs from the rotary seal assembly 10 shown in FIG. 1 substantially in that the sealing lip 58 of the installation sleeve 34 functioning as an oil seal is radially tensioned against the sealing surface 40 by means of a spring element 60, or a garter spring in this case. On account of the axial longitudinal extension of the sealing lip 58, said sealing lip can also follow higher degrees of eccentricity of the second machine part 14 and thereby reliably seal the sealing gap 18 from the ingress of dirt or the like. By way of example, the inside 50 of the support body 46 rests against the sealing surface 40. In this way, the support body 46 forms a (plain) bearing for the rotatable machine part 14.

Figure 4:
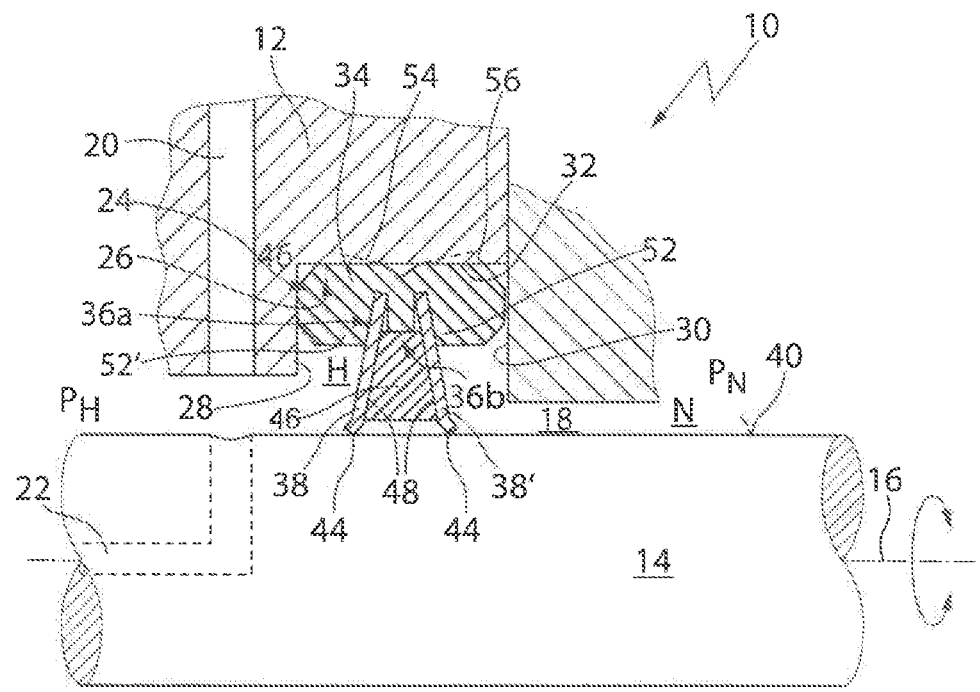
FIG. 4 is a partial sectional view of a further rotary seal assembly having a bidirectionally activatable rotary seal.

FIG. 4 is a partial view of a rotary seal assembly 10 in which the shown rotary seal 24 comprises an installation sleeve 34 having two rotary seal elements 38, 38'. The two rotary seal elements 38, 38' are each arranged axially on either side of the support body 46. In this design, the support body 46 may be axially supported on the rubber-elastic installation sleeve 34 on each side by means of a rotary seal element 38, 38'.

The two rotary seal elements 38, 38' of the installation sleeve 34 may be identically designed. The additional rotary seal element 38' is similarly pressure-activatable, as is the case for the rotary seal element 38 shown on the left in Fig. If pressure greater than a specified differential pressure value of the low-pressure region N (within the meaning of a functional high-pressure region) in relation to the high-pressure region H is applied to the low-pressure region N, the additional rotary seal element 38' can thus be radially pressed against the sealing surface 40 of the second machine part 14, the support body 46 thereby moving axially against the second support region 52' of the rubber-elastic installation sleeve 34 towards the high-pressure region H (which thus becomes the low-pressure region, functionally speaking); the sealing gap is thus sealed if a pressure reversal occurs. In this operating state of the rotary seal assembly, the high-pressure region H and the low-pressure region N are therefore functionally interchanged. The rotary seal 24 shown in FIG. 4 can therefore be pressure-activated on either side. This widens the range of possible uses of the rotary seal assembly 10 even further.

Figure 5:
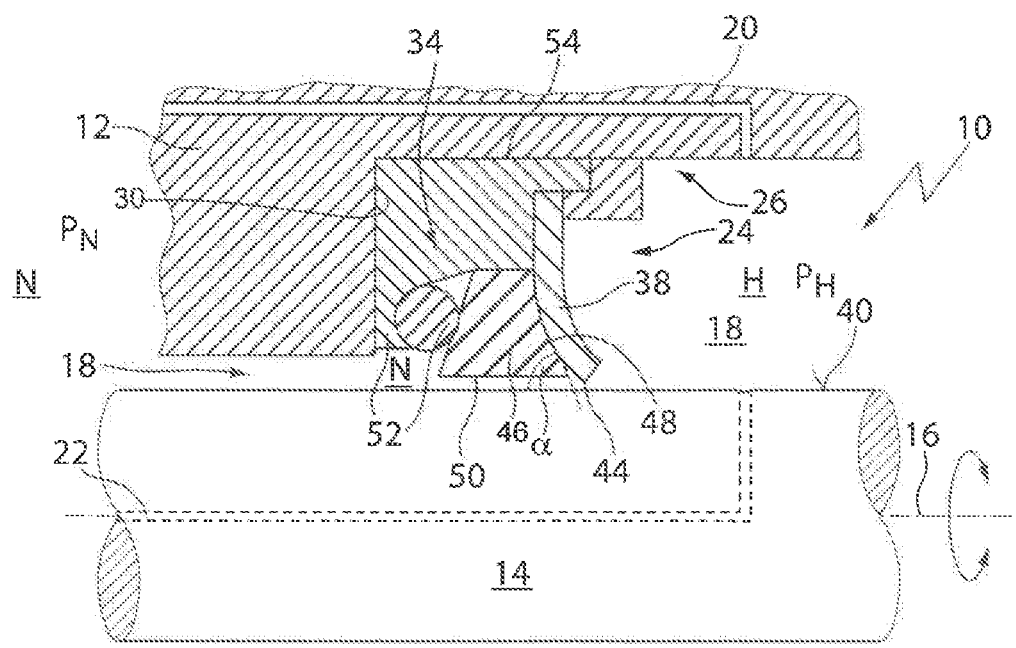
FIG. 5 is a partial sectional view of a rotary seal assembly in which the support region of the installation sleeve is formed by a rubber-elastically deformable annular element formed separately from the installation sleeve.

The rubber-elastic installation sleeve 34 may comprise portions having different moduli of elasticity. For example, the installation sleeve may have a smaller modulus of elasticity in the axial direction than in the radial direction. This can be achieved by a two-component structure of the installation sleeve, for example. The installation sleeve may also be multi-part. For example, the support portion 52 of the installation sleeve 34 may comprise a rubber-elastically deformable support element formed separately from the main body of the installation sleeve, as shown in FIG. 5. In particular, the support element may consist of rubber, silicone or another suitable rubber-elastically deformable material.

Figure 6:
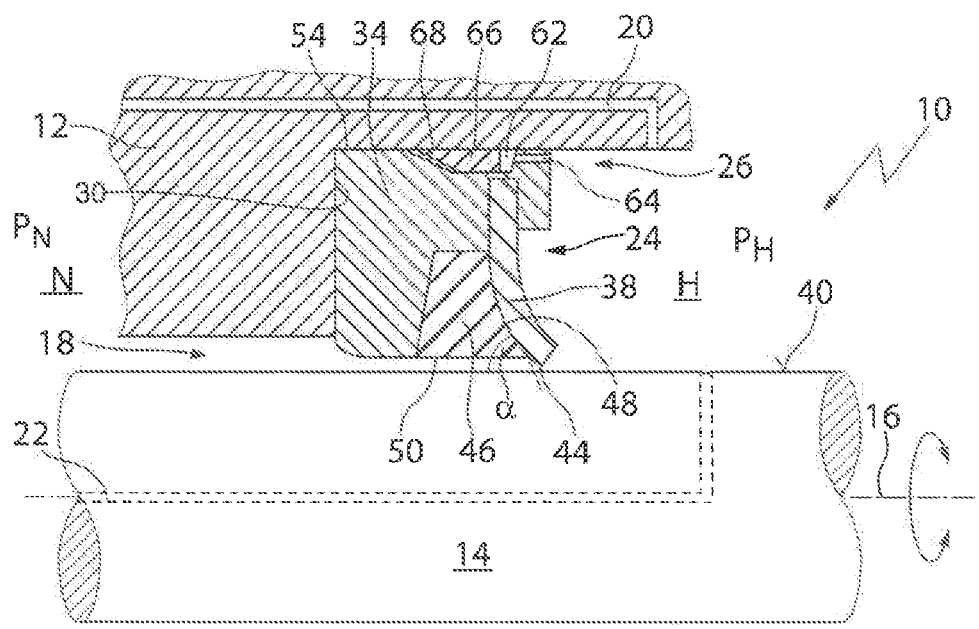
FIG. 6 is a partial sectional view of a rotary seal assembly in which the rotary seal comprises a pressure-activatable tensioning ring.

FIG. 6 shows a rotary seal assembly 10 in which a gap 62 is formed radially between the installation sleeve 34 and the machine part 12 comprising the seal retaining structure 26. The gap 62 is fluidically connected to the high-pressure region H, in this case by means of an axial channel 64 in the installation sleeve 34. An axially clamping or tensioning ring 66, formed in the shape of a tapered ring, is axially movably mounted in the gap 62. The tensioning ring 66 can be radially moved against a circumference-side oblique surface 68 of the installation sleeve 34 by means of fluid pressure prevailing in the high-pressure region H, in order to frictionally fix the installation sleeve 34 on the first machine part 12 at a proportionate pressure. It goes without saying that alternatively the seal retaining structure 26 may also be provided with a suitable oblique surface for the tensioning ring 66. The tensioning ring 66 may have a cross-sectional shape that differs from the tapered shape.

Figure 7:
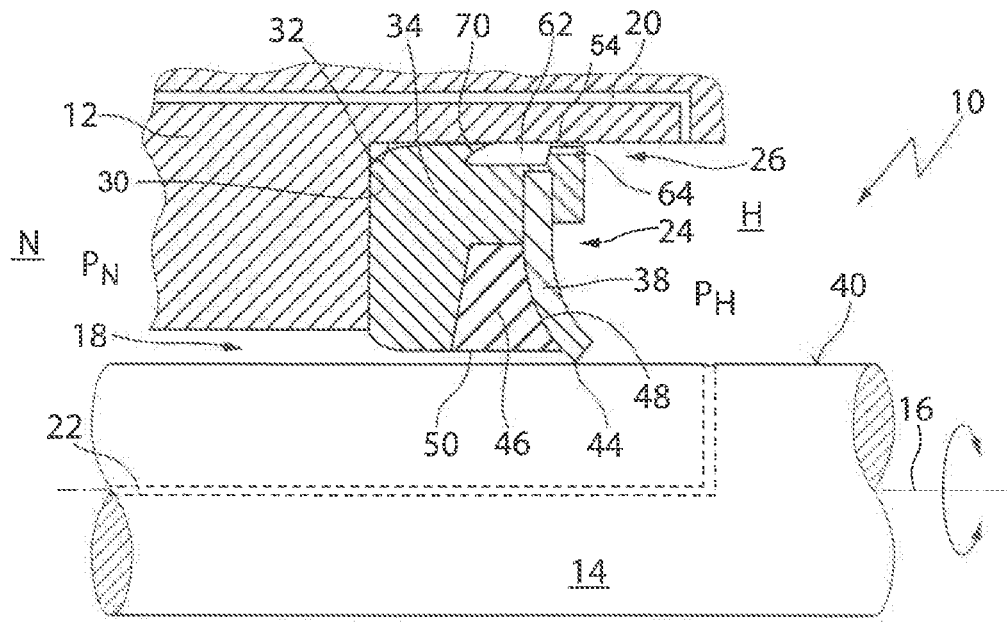
FIG. 7 is a partial sectional view of a rotary seal assembly in which the installation sleeve of the rotary seal assembly comprises a static sealing lip that can be pressed against the seal retaining structure of one of the machine parts at a pressure proportionate to pressure prevailing in the high-pressure region.

In the rotary seal assembly 10 shown in FIG. 7, the outside 54 of the installation sleeve 34 comprises a statically sealing lip 70 that is fluidically connected to the high-pressure region H. The sealing lip 70 can thus be pressurized by a fluid arranged in the high-pressure region H, and pressed against the seal retaining structure 26 of the first machine part by means of said fluid at a proportionate pressure. Firstly, it is thereby possible to achieve particularly reliably sealing between the installation sleeve 34 and the first machine part 12. Secondly, it is thereby possible to reliably counteract unwanted corotation of the installation sleeve 34 together with the rotatably mounted machine part 14, even in high-pressure or extremely high-pressure applications. It should be noted that the installation sleeve 34 is radially internally supported by the support body 46.

Figure 8:
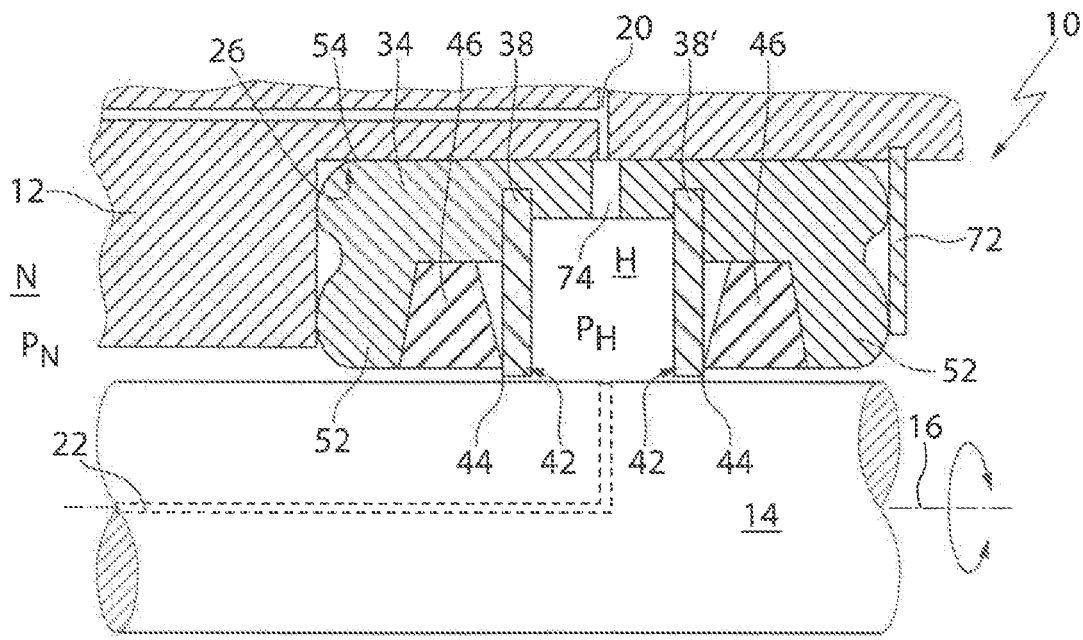
FIG. 8 is a partial sectional view of a further rotary seal assembly in which the installation sleeve comprises two rotary seal elements, in the non-pressurized inactive state.
Figure 9:
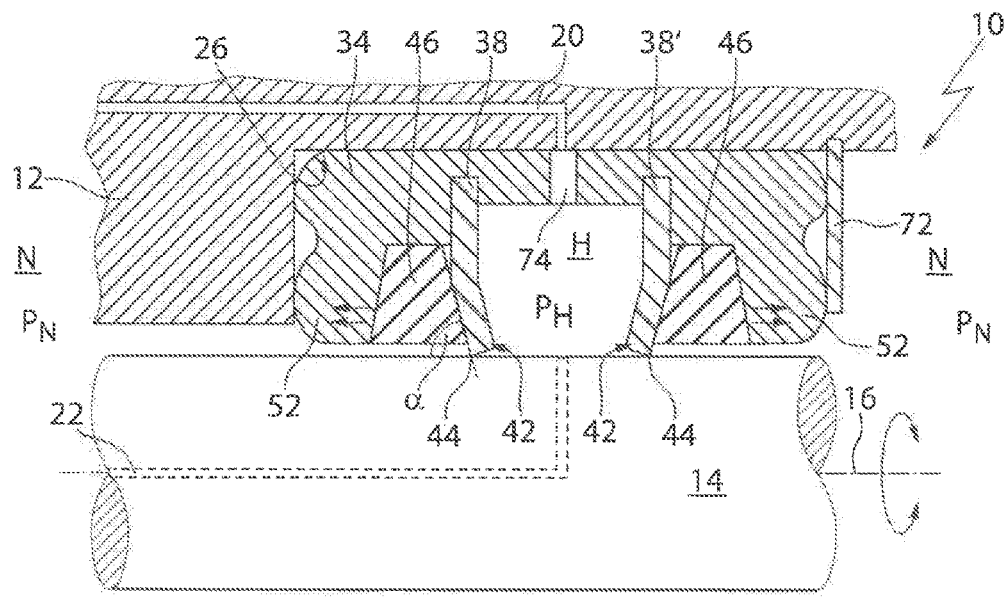
FIG. 9 is a partial sectional view of the rotary seal assembly shown in FIG. 8 in the pressurized, i.e. pressure-activated, operating state of the rotary seal.

FIG. 8 is a partial view of a further rotary seal assembly 10. In this case too, the rotary seal assembly is designed as a rotary union. In order that the high-pressure region H functioning as the rotary union region be sealed on either side, the rubber-elastic installation sleeve 34 comprises two rotary seal elements 38, 38'. The installation sleeve 34 may be retained on the first machine part 12 by means of a circlip 72 or the like so as to be axially positionally secured. The two rotary seal elements 38, 38' may each be designed in a manner corresponding to the rotary seal assemblies 10 from FIGS. 1 to 7. In this case, the rotary seal elements 38, 38' have a rectangular cross-sectional shape, by way of example. The installation sleeve 34 is provided (on the wall side) with a through-hole 74, by means of which the two flow channels 20, 22 of the machine parts 12, 14 are fluidically interconnected. The through-hole 74 thus extends in the radial direction. In the non-pressurized state, the two rotary seal elements 38, 38' extend substantially orthogonal to the axis of rotation 16. When the specified differential pressure value $P_{Diff}$ between the pressure $P_H$ prevailing in the high-pressure region H and the (atmospheric) pressure $P_N$ prevailing in the low-pressure region is exceeded, the two rotary seal elements are axially deflected or moved towards the respective low-pressure regions N such that the sealing edges 44 of the two rotary seal elements 38 sealingly rest against the sealing surface 40 of the second machine part 14. In the process, as already described above, the support bodies 46 are axially moved against the respective support regions 52 of the rubber-elastic installation sleeve 34, as illustrated in FIG. 9.

When the specified differential pressure value $P_{Diff}$ in the high-pressure region H is fallen below, the annular support bodies 46 are pushed towards the high-pressure region H again on account of the elastic resilience of the respective support regions 52 of the rubber-elastic installation sleeve 34. The rotary seal elements 38 are thus moved back into the respective non-pressurized starting positions thereof by the support bodies 46. In this starting position, the sealing edges 44 of the rotary seal elements 38 do not rest against the sealing surface 40 of the second machine part 14 or do not rest thereon at a wear-entailing contact surface pressure.

Figure 10:
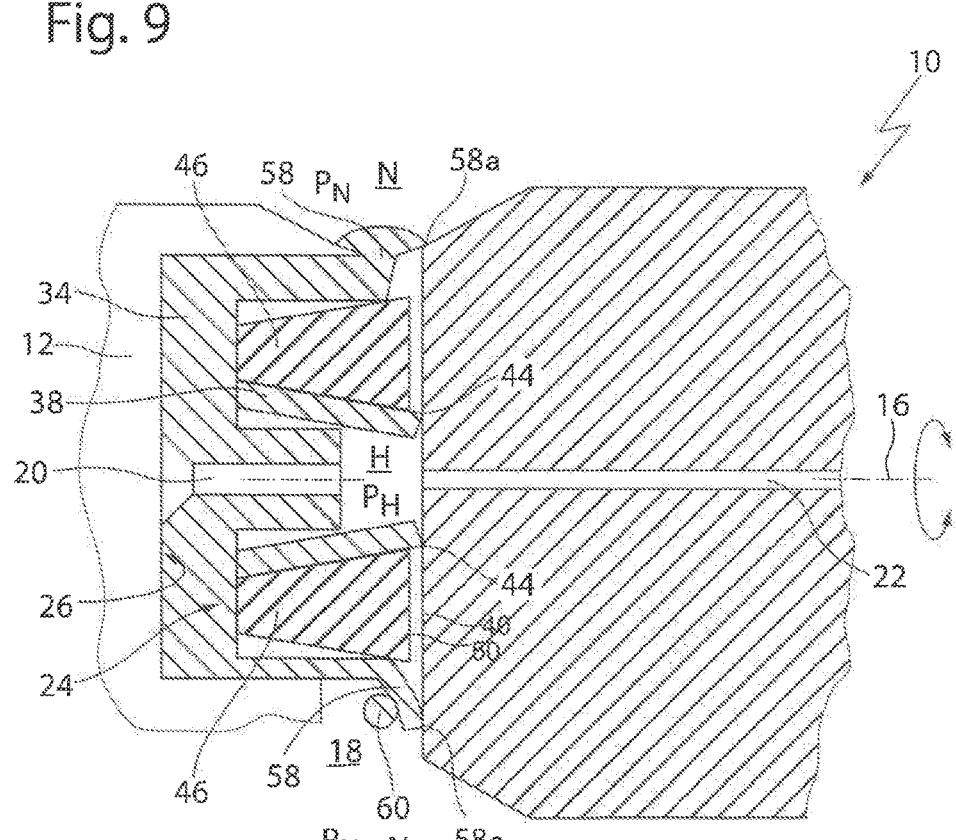
FIG. 10 is a partial sectional view of a rotary seal assembly in which the rotary seal seals axially with respect to the sealing surface of the second machine part.

FIG. 10 shows a further rotary seal assembly 10 designed as a rotary union. The rotary seal assembly 10 differs from the rotary seal assemblies described above in connection with FIGS. 1 to 9 substantially in that the rotary seal 24 seals axially in this case. The sealing surface 40 of the second machine part 14 is therefore formed not by the circumferential surface thereof, but rather by the end face thereof. The rotary seal 24 therefore comprises an annular rotary seal element 38 that seals axially with respect to the axis of rotation 16 of the second machine part 14, i.e. is designed as an axial seal element. The support body 46 is annular and engages around the outside of the rotary seal element 38. The support body 46 and the rotary seal element 38 are therefore coaxial with the axis of rotation 16. The support body 46 is formed in one piece in the present case and consists of a viscoplastically deformable material. The support body 46 may also be designed as a rigid body. In this case, the support body 46 is multi-part, in particular two-part, such that the segments (ring halves, for example) thereof can be translated radially with respect to the axis of rotation 16 in order to allow the rotary seal element 38 to be pressure-activated and to be returned to the inactive position thereof again, as described above.

In the embodiments of the rotary seal assembly 10 shown in the drawings, the rotary seal elements 38 rest preferably loosely against the respective associated support bodies 46. With a view to a particularly sensitive responsiveness of the rotary seal to an increase in the pressure in the high-pressure region H, the material pairing of a particular support body 46 and the rotary seal element 38 laterally supported thereon is preferably designed to allow sliding play between the two components at minimal friction.

The above-described rotary seal assemblies 10 or rotary seals 24 are suitable for a wide range of technical applications. For example, they can be used in particular for tire pressure control systems in motor vehicles. In this case, the second machine part 14 may be a drive shaft or a wheel axle of a motor vehicle (not shown), while the first machine part 12 may be used to mount the second machine part 14.

What is claimed is:

1. A rotary seal assembly, comprising:
    a first machine part and a second machine part rotatable about an axis of rotation relative to the first machine part, wherein one of the two machine parts comprises a seal retaining structure, and the other of the two machine parts comprises a sealing surface, and having a rotary seal arranged on the seal retaining structure of one machine part in order to seal a high-pressure region H from a low-pressure region N of the rotary seal assembly;
    an installation sleeve made of a rubber-elastic material;
    at least one pressure-activatable rotary seal element, which has a sealing edge, is arranged in or on the installation sleeve and extends away from the installation sleeve towards the sealing surface;
    a support body, which rests, on the low-pressure-region side, against a support region of the rubber-elastically deformable installation sleeve and on which the rotary seal element is directly supported on the low-pressure-region side such that the sealing edge is arranged, in a non-pressurized operating state, in an inactive position in which the sealing edge is spaced apart from the sealing surface or rests against the sealing surface without contact surface pressure or substantially without contact surface pressure;
    wherein when a specified differential pressure value PDiff between the high-pressure region H and the low-pressure region N is exceeded, the rotary seal element causes the support body to move towards the low-pressure region N, the support region thereby elastically deforming, such that the sealing edge of the rotary seal element is sealingly pressed against the sealing surface; and
    wherein when the specified differential pressure value PDiff is fallen below, the support region elastically recovers its shape, the support body thereby moving back towards the high-pressure region H such that the sealing edge of the rotary seal element moves out of the sealingly resting position of said sealing edge against the sealing surface, back into the inactive position of said sealing edge.

2. The rotary seal assembly according to claim 1, wherein the rotary seal element is designed as a radial seal element or as an axial seal element.

3. The rotary seal assembly according to claim 1, wherein the support body is designed as a bearing part for the machine part comprising the sealing surface, and rests against the sealing surface, preferably directly.

4. The rotary seal assembly according to claim 1, wherein the support body consists of metal, a hard plastics material, a composite material or a technical ceramic.

5. The rotary seal assembly according to claim 1, wherein the rubber-elastic installation sleeve comprises at least one dynamically sealing lip, which is arranged so as to be offset towards the low-pressure region N in relation to the rotary seal element and sealingly rests against the sealing surface of the second machine part in both the pressurized and non-pressurized states of the rotary seal assembly.

6. The rotary seal assembly according to claim 1, wherein the support body comprises a side flank, on the high-pressure-region side, that extends obliquely in relation to the sealing surface at an acute angle α of α<90°, preferably α<80°.

7. The rotary seal assembly according to claim 1, wherein the support body projects beyond the rotary seal element towards the sealing surface in the non-pressurized operating state.

8. The rotary seal assembly according to claim 1, wherein the circumference of the support body rests against and is supported on the rubber-elastic installation sleeve, preferably in a manner free of play.

9. The rotary seal assembly according to claim 1, wherein the support body has a cross-sectional shape that widens towards the sealing surface.

10. The rotary seal assembly according to claim 1, wherein the rubber-elastic installation sleeve comprises, on the outside thereof, at least one statically sealing lip that sealingly rests against the first machine part.

11. The rotary seal assembly according to claim 10, wherein the sealing lip is fluidically connected to the high-pressure region H and can be pressed against the first machine part by means of fluid pressure prevailing in the high-pressure region H.

12. The rotary seal assembly according to claim 1, wherein the seal retaining structure is designed as a retaining groove and comprises, on the low-pressure side, a groove flank against which the rubber-elastic installation sleeve rests.

13. The rotary seal assembly according to claim 1, wherein, between the installation sleeve and the first machine part, a clearance is formed that is fluidically connected to the high-pressure region H, there being mounted in the clearance a tensioning element that can be axially moved against an oblique surface of the installation sleeve or of the seal retaining structure by means of fluid pressure PH prevailing in the high-pressure region H, in order to frictionally fix the installation sleeve on the first machine part.

14. The rotary seal assembly according to claim 1, wherein the rotary seal element is retained in a retaining groove in the rubber-elastically deformable installation sleeve.

15. The rotary seal assembly according to claim 1, wherein the installation sleeve comprises an additional rotary seal element that preferably directly rests against and is supported on a second support body in the axial direction.

16. The rotary seal assembly according to claim 15, wherein the rotary seal assembly is designed as a rotary union, the high-pressure region H being arranged between the two rotary seal elements and forming a first rotary union region, and the installation sleeve comprising at least one through-hole in order to fluidically connect a first fluid flow channel, which is arranged in the first machine part, to a second fluid flow channel, which is arranged in the second machine part, by means of the rotary union region.

17. The rotary seal assembly according to claim 1, wherein the rotary seal assembly is designed as a rotary union and comprises an additional rotary seal, the high-pressure region H being formed between the two rotary seals and forming a first rotary union region, by means of which a first fluid flow channel, which is arranged in the first machine part, is fluidically connected to a second fluid flow channel, which is arranged in the second machine part.

18. The rotary seal assembly according to claim 16, wherein a plurality of rotary union regions that are each axially delimited on either side by a rotary seal element of the same rotary seal or of a plurality of rotary seals.

19. The rotary seal assembly according to claim 17, wherein a plurality of rotary union regions that are each axially delimited on either side by a rotary seal element of the same rotary seal or of a plurality of rotary seals.

20. The rotary seal assembly according to claim 1, wherein the seal retaining structure of one machine part is formed by a metal sleeve that is directly retained on said machine part in a press fit.

21. The rotary seal assembly according to claim 1, wherein the sealing edge is configured to be fluidically in direct contact to the high-pressure region H and pressed against the first machine part by a fluid pressure in the high-pressure region H.

* * * * *